United States Patent
Jacobs et al.

(10) Patent No.: US 9,235,485 B2
(45) Date of Patent: Jan. 12, 2016

(54) MOVING OBJECTS IN A PRIMARY COMPUTER BASED ON MEMORY ERRORS IN A SECONDARY COMPUTER

(71) Applicant: International Business Machines Corporation, Armonk, NY (US)

(72) Inventors: Stuart Z. Jacobs, Lakeville, MN (US); David A. Larson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 184 days.

(21) Appl. No.: 13/947,420

(22) Filed: Jul. 22, 2013

(65) Prior Publication Data
US 2015/0026508 A1 Jan. 22, 2015

(51) Int. Cl.
*G06F 11/20* (2006.01)
*G06F 11/16* (2006.01)

(52) U.S. Cl.
CPC ........ *G06F 11/2094* (2013.01); *G06F 11/1658* (2013.01); *G06F 11/1666* (2013.01); *G06F 11/2035* (2013.01); *G06F 11/2048* (2013.01); *G06F 11/2082* (2013.01)

(58) Field of Classification Search
CPC ............ G06F 11/1428; G06F 11/1658; G06F 11/1666
See application file for complete search history.

(56) References Cited

U.S. PATENT DOCUMENTS

| 7,089,448 | B2 | 8/2006 | Hinshaw et al. |
| 7,472,221 | B1 | 12/2008 | Cartmell et al. |
| 7,627,775 | B2 | 12/2009 | Kern et al. |
| 7,882,326 | B2 | 2/2011 | Armstrong et al. |
| 7,930,496 | B2 | 4/2011 | Kubo et al. |
| 8,255,639 | B2 | 8/2012 | Heyrman et al. |
| 8,407,515 | B2 * | 3/2013 | Heyrman ............ G06F 11/2082 714/6.12 |
| 8,605,132 | B1 * | 12/2013 | Swanson et al. ........... 348/14.01 |
| 2004/0059735 | A1 * | 3/2004 | Gold et al. .................... 707/100 |
| 2005/0278439 | A1 * | 12/2005 | Cherkasova .................. 709/223 |
| 2010/0107158 | A1 * | 4/2010 | Chen et al. ......................... 718/1 |
| 2011/0072430 | A1 | 3/2011 | Mani |
| 2011/0154104 | A1 | 6/2011 | Swanson et al. |
| 2012/0131639 | A1 | 5/2012 | Alex et al. |
| 2012/0151252 | A1 | 6/2012 | Harris et al. |
| 2013/0262917 | A1 * | 10/2013 | Takemori ..................... 714/4.11 |

FOREIGN PATENT DOCUMENTS

| CN | 1983202 A | 6/2007 |
| CN | 101097501 A | 1/2008 |
| CN | 101271409 A | 9/2008 |

OTHER PUBLICATIONS

Nidhi Aggarwal et al., "Implementing High Availability Memory with a Duplication Cache," Microarchitecture, Micro-41, 2008 41st IEEE/ACM International Symposium on, IEEE, 2008.

* cited by examiner

*Primary Examiner* — Joseph Schell
(74) *Attorney, Agent, or Firm* — Owen J. Gamon; Roy W. Truelson

(57) ABSTRACT

In an embodiment, a partition is executed at a primary server, wherein the partition accesses a first memory location at a first memory block address at the primary server. If a first corresponding memory location at a secondary server has an error, wherein the first corresponding memory location at the secondary server corresponds to the first memory location at the primary server, then an object is moved from the first memory location at the primary server to a second memory location at the primary server.

20 Claims, 7 Drawing Sheets

MEMORY TABLE AT PRIMARY SERVER A (140-1)

| MEMORY BLOCK ADDRESS (302) | ERROR AT PRIMARY SERVER A (304) | ERROR AT SECONDARY SERVER B (306) | ERROR AT SECONDARY SERVER C (308) | ERROR AT SECONDARY SERVER D (310) |
|---|---|---|---|---|
| 0AF2 | CORRECTED | UNCORRECTABLE | NONE | NONE |
| 0B99 | CORRECTED | NONE | NONE | CORRECTED |
| C1F2 | UNCORRECTABLE | NONE | NONE | NONE |
| CB99 | NONE | CORRECTED | NONE | CORRECTED |
| CDEF | NONE | NONE | CORRECTED | NONE |
| DB99 | NONE | NONE | NONE | UNCORRECTABLE |
| EC62 | UNCORRECTABLE | NONE | NONE | NONE |
| F111 | NONE | NONE | NONE | NONE |

NUMBER OF MEMORY BLOCKS AT SECONDARY SERVER B WITH ERRORS (312)

NUMBER OF MEMORY BLOCKS AT SECONDARY SERVER C WITH ERRORS (314)

NUMBER OF MEMORY BLOCKS AT SECONDARY SERVER D WITH ERRORS (316)

FIG. 3

MOVING OBJECTS IN A PRIMARY COMPUTER BASED ON MEMORY ERRORS IN A SECONDARY COMPUTER

FIELD

An embodiment of the invention generally relates to computer systems and more particularly to computer systems that use mirroring.

BACKGROUND

Computer systems typically comprise a combination of hardware (such as semiconductors, transistors, chips, and circuit boards) and computer programs. As computers and the data they store have become more important, users have become increasingly intolerant of any interruption to the availability of the computers. To satisfy user requirements of high availability, computers may provide redundant components, so that in the event that one component fails or becomes unavailable, the computers switch automatically to using another component.

One high availability technique is called mirroring or check pointing, in which a primary computer periodically copies contents of its memory and processor state to a secondary computer. Mirroring involves tracking changes to the memory accessed by a partition and changes to the state of the processor on which the partition executes at the primary computer, periodically halting execution of the partition at the primary computer, sending the tracked changes over a network to the secondary computer, waiting for the secondary computer to acknowledge receipt of the tracked changes, and resuming execution of the halted partition. In the event of a failure of the primary computer, the secondary computer starts execution of the partition that was being executed by the primary computer, using the tracked changes and processor state, in a manner that is transparent to the applications that execute in the partition.

SUMMARY

A method, computer-readable storage medium, and computer are provided. In an embodiment, a partition is executed at a primary server, wherein the partition accesses a first memory location at a first memory block address at the primary server. If a first corresponding memory location at a secondary server has an error, wherein the first corresponding memory location at the secondary server corresponds to the first memory location at the primary server, then an object is moved from the first memory location at the primary server to a second memory location at the primary server.

BRIEF DESCRIPTION OF THE SEVERAL VIEWS OF THE DRAWINGS

FIG. 3 depicts a block diagram of an example data structure for a memory table, according to an embodiment of the invention.

It is to be noted, however, that the appended drawings illustrate only example embodiments of the invention, and are therefore not considered a limitation of the scope of other embodiments of the invention.

DETAILED DESCRIPTION

Figure 1:
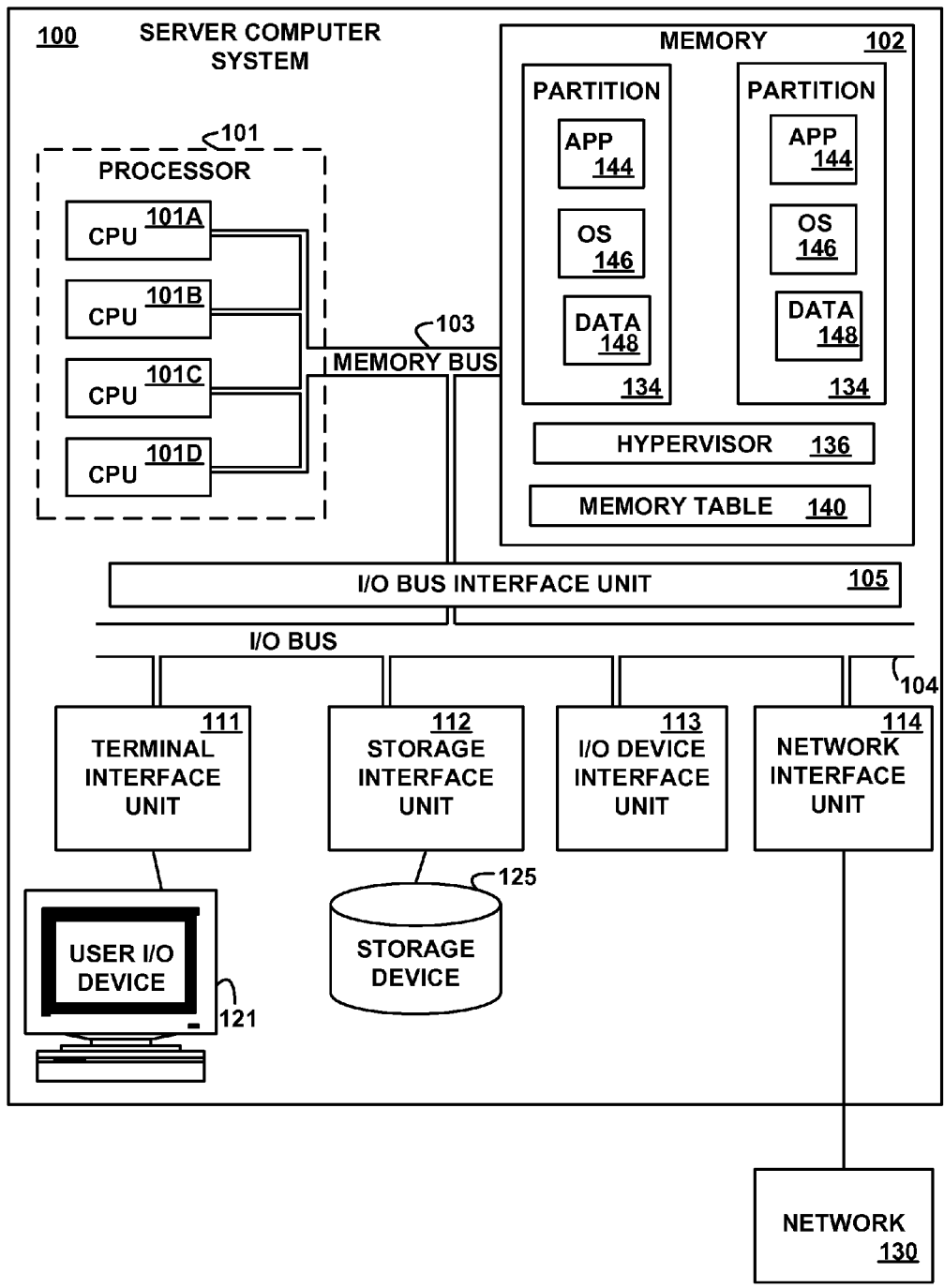
FIG. 1 depicts a high-level block diagram of an example system for implementing an embodiment of the invention.

Referring to the Drawings, wherein like numbers denote like parts throughout the several views, FIG. 1 depicts a high-level block diagram representation of a server computer system 100 connected to a network 130, according to an embodiment of the present invention. The mechanisms and apparatus of embodiments of the present invention apply equally to any appropriate computing system. The major components of the server computer system 100 comprise one or more processors 101, memory 102, a terminal interface unit 111, a storage interface unit 112, an I/O (Input/Output) device interface unit 113, and a network interface unit 114, all of which are communicatively coupled, directly or indirectly, for inter-component communication via a memory bus 103, an I/O bus 104, and an I/O bus interface unit 105.

The server computer system 100 contains one or more general-purpose programmable central processing units (CPUs) 101A, 101B, 101C, and 101D, herein generically referred to as the processor 101. In an embodiment, the server computer system 100 contains multiple processors typical of a relatively large system; however, in another embodiment the server computer system 100 may alternatively be a single CPU system. Each processor 101 executes instructions stored in the memory 102 and may comprise one or more levels of on-board cache.

In an embodiment, the memory 102 may comprise a random-access semiconductor memory, storage device, or storage medium (either volatile or non-volatile) for storing or encoding data and programs. In another embodiment, the memory 102 represents the entire virtual memory of the server computer system 100, and may also include the virtual memory of other computer systems coupled to the server computer system 100 or connected via the network 130. The memory 102 is conceptually a single monolithic entity, but in other embodiments the memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 102 is illustrated as comprising a plurality of partitions 134, a hypervisor 136, and a memory table 140. Although the partitions 134, the hypervisor 136, and the memory table 140 are illustrated as being stored within the memory 102 in the server computer system 100, in other embodiments some or all of them may be on different computer systems and may be accessed remotely, e.g., via the network 130. Further, the server computer system 100 may use virtual addressing mechanisms that allow the programs of the server computer system 100 to behave as if they only have access to a large, single storage entity instead of access to multiple, smaller storage entities. Thus, while the partitions 134, the hypervisor 136, and the memory table 140 are illustrated as residing in the memory 102, these elements are not necessarily all completely contained in the same storage device at the same time.

Each of the partitions 134 comprises an application (app) 144, an operating system (OS) 146, and partition data 148. Any number of partitions 134 may be supported, and the number of the partitions 134 resident at any time in the computer 100 may change dynamically as partitions 134 are added to or removed from the computer 100. Each of the partitions 134 comprises instructions that execute on the processor 101 in a separate, or independent, memory space. In various embodiments, the application 144 is implemented as a user application, a third-party application, or any portion, multiple, or combination thereof. The applications 144 and the operating systems 146 comprise instructions that execute on the processor 101 or statements that are interpreted by instructions that execute on the processor 101. Each of the applications 144 may be the same or different from each other, each of the operating systems 146 may be the same or different from each other, and each of the data 148 may be the same or different from each other.

Although the hypervisor 136 is illustrated as being stored within the memory 102, in other embodiments, all or a portion of the hypervisor 136 may be implemented in firmware or hardware. The hypervisor 136 may perform both low-level management functions, such as page table management and may also perform higher-level management functions, such as creating and deleting the partitions 134, concurrent I/O maintenance, and allocating/deallocating processors, memory and other hardware or program resources to/from the various partitions 134. The hypervisor 136 controls the allocation, locking, and unlocking of the shared resources to the partitions 134 and the access of the shared resources by the partitions 134, ensuring security and isolation of these partitions 134 within the server computer system 100. The hypervisor starts, stops, and suspends execution of the partitions 134 on the processor 101.

The hypervisor 136 statically and/or dynamically allocates to each partition 134 a portion of the available resources in the computer 100. For example, each partition 134 may be allocated one or more of the processors 101 and/or one or more hardware threads on which to execute, as well as a portion of the available memory space to access. The partitions 134 may share specific program and/or hardware resources such as the processors 101, such that a given resource may be utilized by more than one partition 134. In the alternative, program and hardware resources may be allocated to only one partition 134 at a time. Additional resources, e.g., mass storage, backup storage, user input, network connections, and the I/O adapters therefor, are typically allocated to one or more of the partitions 134. Resources may be allocated in a number of manners, e.g., on a bus-by-bus basis, or on a resource-by-resource basis, with multiple partitions 134 sharing resources on the same bus. Some resources may be allocated to multiple partitions 134 at a time. The resources identified herein are examples only, and any appropriate resource capable of being allocated may be used.

In an embodiment, the partitions 134 and/or the hypervisor 136 comprise instructions that execute on the processor 101 or statements that are interpreted by instructions executing on the processor 101 to perform the functions, as further described below with reference to FIGS. 2, 3, 4, 5, 6, and 7. In another embodiment, the partitions 134 and/or the hypervisor 136 may be implemented in microcode or firmware. In another embodiment, the hypervisor 136 may be implemented in hardware via logic gates, semiconductor devices, chips, circuits, circuit cards, and/or other physical hardware devices.

The memory bus 103 provides a data communication path or communications fabric for transferring data among the processor 101, the memory 102, and the I/O bus interface unit 105. The I/O bus interface unit 105 is further coupled to the I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the I/O bus 104.

The I/O interface units support communication with a variety of storage and I/O devices. For example, the terminal interface unit 111 supports the attachment of one or more user I/O devices, which may comprise user output devices (such as a video display device, projectors, a speaker, and/or television set) and user input devices (such as a camera, a keyboard, a mouse, a keypad, a touchpad, a trackball, buttons, Radio Frequency Identifier Tags, a light pen, a finger, a stylus, or other pointing device). A user may manipulate the user input devices using a user interface, in order to provide input data and commands to the user I/O device 121 and the server computer system 100, and may receive output data via the user output devices. For example, a user interface may be presented via the user I/O device 121, such as displayed on a display device. The user I/O device 121 may be of any size and may accommodate multiple users viewing and touching the display device simultaneously or collaboratively, and in an embodiment, any user may touch at any location on the display device.

The storage interface unit 112 supports the attachment of one or more disk drives or direct access storage devices 125 (which are typically rotating magnetic disk drive storage devices, although they could alternatively be other storage devices, including arrays of disk drives configured to appear as a single large storage device to a host computer). In another embodiment, the storage device 125 may be implemented via any type of secondary storage device. The contents of the memory 102, or any portion thereof, may be stored to and retrieved from the storage device 125, as needed. The I/O device interface unit 113 provides an interface to any of various other input/output devices or devices of other types, such as printers or fax machines. The network interface unit 114 provides one or more communications paths from the server computer system 100 to other digital devices and computer systems; such paths may comprise, e.g., one or more networks 130.

Although the memory bus 103 is shown in FIG. 1 as a relatively simple, single bus structure providing a direct communication path among the processors 101, the memory 102, and the I/O bus interface unit 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 105 and the I/O bus 104 are shown as single respective units, the server computer system 100 may, in fact, contain multiple I/O bus interface units 105 and/or multiple I/O buses 104. While multiple I/O interface units are shown, which separate the I/O bus 104 from various communications paths running to the various I/O devices, in other embodiments some or all of the I/O devices are connected directly to one or more system I/O buses.

In various embodiments, the server computer system 100 is a multi-user mainframe computer system, a single-user system, or a server computer or similar device that has little or no direct user interface, but receives requests from other computer systems (clients). In other embodiments, the server computer system 100 is implemented as a desktop computer, portable computer, laptop or notebook computer, tablet computer, pocket computer, telephone, smart phone, pager, automobile, teleconferencing system, appliance, or any other appropriate type of electronic device.

The network 130 may be any suitable bus, network, or any multiple or combination thereof, and may support any appropriate protocol suitable for communication of data and/or code to/from the server computer system 100. In various embodiments, the network 130 may represent a storage device or a combination of storage devices, either connected directly or indirectly to the server computer system 100. In another embodiment, the network 130 may support wireless communications. In another embodiment, the network 130 may support hard-wired communications, such as a telephone line or cable. In another embodiment, the network 130 may be the Internet and may support IP (Internet Protocol). In another embodiment, the network 130 is implemented as a local area network (LAN) or a wide area network (WAN). In another embodiment, the network 130 is implemented as a hotspot service provider network. In another embodiment, the network 130 is implemented an intranet. In another embodiment, the network 130 is implemented as any appropriate cellular data network, cell-based radio network technology, or wireless network. In another embodiment, the network 130 is implemented as any suitable bus, network, or any multiple or combination thereof.

FIG. 1 is intended to depict the representative major components of the server computer system 100 and the network 130. But, individual components may have greater complexity than represented in FIG. 1, components other than or in addition to those shown in FIG. 1 may be present, and the number, type, and configuration of such components may vary. Several particular examples of such additional complexity or additional variations are disclosed herein; these are by way of example only and are not necessarily the only such variations. The various program components illustrated in FIG. 1 and implementing various embodiments of the invention may be implemented in a number of manners, including using various computer applications, routines, components, programs, objects, modules, data structures, etc., and are referred to hereinafter as "computer programs," or simply "programs."

The computer programs comprise one or more instructions or statements that are resident at various times in various memory and storage devices in the server computer system 100 and that, when read and executed by one or more processors in the server computer system 100 or when interpreted by instructions that are executed by one or more processors, cause the server computer system 100 to perform the actions necessary to execute steps or elements comprising the various aspects of embodiments of the invention. Aspects of embodiments of the invention may be embodied as a system, method, or computer program product. Accordingly, aspects of embodiments of the invention may take the form of an entirely hardware embodiment, an entirely program embodiment (including firmware, resident programs, micro-code, etc., which are stored in a storage device) or an embodiment combining program and hardware aspects that may all generally be referred to herein as a "circuit," "module," or "system." Further, embodiments of the invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium, may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage media may comprise: an electrical connection having one or more wires, a portable computer diskette, a hard disk (e.g., the storage device 125), a random access memory (RAM) (e.g., the memory 102), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device.

A computer-readable signal medium may comprise a propagated data signal with computer-readable program code embodied thereon, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagates, or transports a program for use by, or in connection with, an instruction execution system, apparatus, or device. Program code embodied on a computer-readable medium may be transmitted using any appropriate medium, including but not limited to, wireless, wire line, optical fiber cable, Radio Frequency, or any suitable combination of the foregoing.

Computer program code for carrying out operations for aspects of embodiments of the present invention may be written in any combination of one or more programming languages, including object oriented programming languages and conventional procedural programming languages. The program code may execute entirely on the user's computer, partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments of the invention are described below with reference to flowchart illustrations and/or block diagrams of methods, apparatus (systems), and computer program products. Each block of the flowchart illustrations and/or block diagrams, and combinations of blocks in the flowchart illustrations and/or block diagrams may be implemented by computer program instructions embodied in a computer-readable medium. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified by the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture, including instructions that implement the function/act specified by the flowchart and/or block diagram block or blocks.

The computer programs defining the functions of various embodiments of the invention may be delivered to a computer system via a variety of tangible computer-readable storage media that may be operatively or communicatively connected (directly or indirectly) to the processor or processors. The computer program instructions may also be loaded onto a computer, other programmable data processing apparatus, or other devices to cause a series of operational steps to be performed on the computer, other programmable apparatus, or other devices to produce a computer-implemented process, such that the instructions, which execute on the computer or other programmable apparatus, provide processes for implementing the functions/acts specified in the flowcharts and/or block diagram block or blocks.

The flowchart and the block diagrams in the figures illustrate the architecture, functionality, and operation of possible implementations of systems, methods, and computer program products, according to various embodiments of the present invention. In this regard, each block in the flowcharts or block diagrams may represent a module, segment, or portion of code, which comprises one or more executable instructions for implementing the specified logical function (s). In some embodiments, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flow chart illustrations, can be implemented by special purpose hardware-based systems that perform the specified functions or acts, in combinations of special purpose hardware and computer instructions.

Embodiments of the invention may also be delivered as part of a service engagement with a client corporation, non-profit organization, government entity, or internal organizational structure. Aspects of these embodiments may comprise configuring a computer system to perform, and deploying computing services (e.g., computer-readable code, hardware, and web services) that implement, some or all of the methods described herein. Aspects of these embodiments may also comprise analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems. In addition, various programs described hereinafter may be identified based upon the application for which they are implemented in a specific embodiment of the invention. But, any particular program nomenclature that follows is used merely for convenience, and thus embodiments of the invention are not limited to use solely in any specific application identified and/or implied by such nomenclature. The exemplary environments illustrated in FIG. 1 are not intended to limit the present invention. Indeed, other alternative hardware and/or program environments may be used without departing from the scope of embodiments of the invention.

Figure 2:
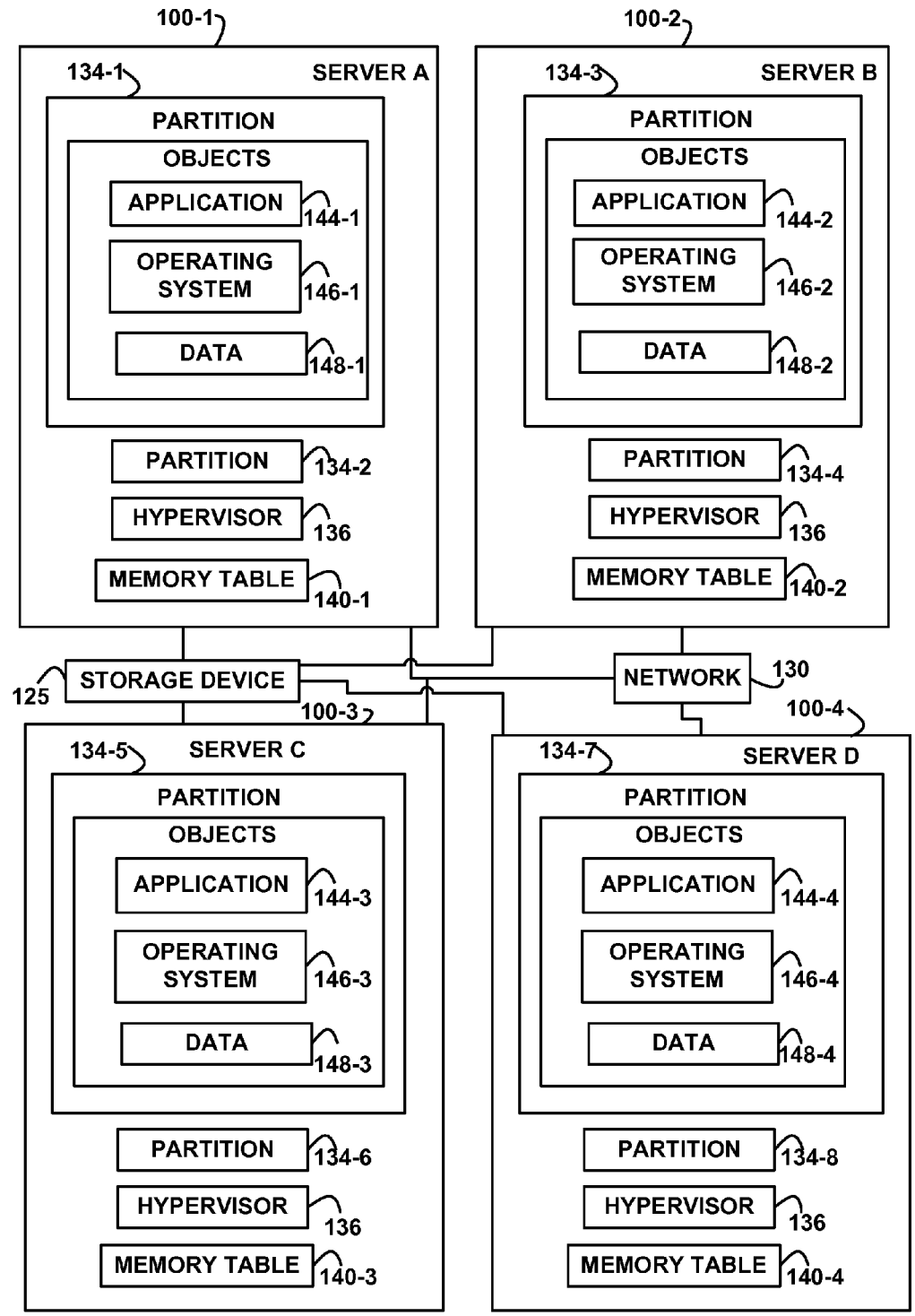
FIG. 2 depicts a high-level block diagram of example server computers connected via a network and secondary storage devices, according to an embodiment of the invention.

FIG. 2 depicts a high-level block diagram of an example server computer system A 100-1, an example server computer system B 100-2, an example server computer system C 100-3, and an example server computer system D 100-4 connected via the network 130 and the storage device 125, according to an embodiment of the invention. The server computer systems 100-1, 100-2, 100-3, and 100-4 are examples of, and are generically referred to by, the server computer system 100. The server computer A 100-1 comprises a partition 134-1, a partition 134-2, a hypervisor 136, and a memory table 140-1. The partition 134-1 comprises applications 144-1, an operating system 146-1, and data 148-1, which are referred to herein as objects. The partition 134-2 may comprise the same or different applications, operating systems, and data as the partitions 134-1, 134-3, 134-4, 134-5, 134-6, 134-7, and 134-8.

The server computer B 100-2 comprises a partition 134-3, a partition 134-4, a hypervisor 136, and a memory table 140-2. The partition 134-3 comprises applications 144-2, an operating system 146-2, and data 148-2, which are referred to herein as objects. The partition 134-3 may comprise the same or different applications, operating systems, and data as the partitions 134-1, 134-2, 134-4, 134-5, 134-6, 134-7, and 134-8. The server computer C 100-3 comprises a partition 134-5, a partition 134-6, a hypervisor 136, and a memory table 140-3. The partition 134-5 comprises applications 144-3, an operating system 146-3, and data 148-3, which are referred to herein as objects. The partition 134-6 may comprise the same or different applications, operating systems, and data as the partitions 134-1, 134-2, 134-3, 134-4, 134-5, 134-7, and 134-8. The server computer D 100-4 comprises a partition 134-7, a partition 134-8, a hypervisor 136, and a memory table 140-4. The partition 134-7 comprises applications 144-4, an operating system 146-4, and data 148-4, which are referred to herein as objects. The partition 134-8 may comprise the same or different applications, operating systems, and data as the partitions 134-1, 134-2, 134-3, 134-4, 134-5, 134-6, and 134-7.

The partitions 134-1, 134-2, 134-3, 134-4, 134-5, 134-6, 134-7, and 134-8 are examples of, and are generically referred to by, the partition 134 (FIG. 1). The memory tables 140-1, 140-2, 140-3, and 140-4 are examples of, and are generically referred to by, the memory table 140 (FIG. 1). The applications 144-1, 144-2, 144-3, and 144-4 are examples of, and are generically referred to by, the application 144 (FIG. 1). The applications 144-1, 144-2, 144-3, and 144-4 may be the same or different from each other. The operating systems 146-1, 146-2, 146-3, and 146-4 are examples of, and are generically referred to by, the operating system 146 (FIG. 1). The operating systems 146-1, 146-2, 146-3, and 146-4 may be the same or different from each other. The data 148-1, 148-2, 148-3, and 148-4 are examples of, and are generically referred to by, the data 148 (FIG. 1). The data 148-1, 148-2, 148-3, and 148-4 may be the same or different from each other.

The respective data 148-1, 148-2, 148-3, and 148-4 may comprise state information that describes the current state of execution of the respective partition 134-1, 134-3, 134-5, and 134-7 that comprises the respective data 148-1, 148-2, 148-3, and 148-4 and may also comprise buffered data that the respective partition has not yet written to the network 130 or to the storage device 125.

The server computer on which a partition 134 executes is the primary server for that partition 134. A partition 134 does not execute on its secondary server(s). Instead, the partition 134 is mirrored on the secondary server, meaning that the applications and operating system 146 of the partition 134 are installed and present in the memory of the secondary server and the primary server periodically copies data from the partition 134 at the primary server to the partition 134 at the secondary server, so that, in response to a failure of the primary server, the secondary server may become the new primary server and the partition 134 at the new primary server may begin executing at the point that the partition 134 at the failed primary server stopped, in an manner that is substantially transparent to the user of the partition 134, with minimal interruption. Thus, a server may be the secondary server for a partition 134, prior to a failover operation, and then become the new primary server for that same partition 134, after a failover operation. Further, a server may be a primary server for one partition 134 and may also be a secondary server for another partition 134, at the same time. A partition 134 uses the memory table 140 located at the primary server, on which the partition 134 executes, as further described below. Any of the servers 100-1, 100-2, 100-3, or 100-4 may be a primary server for one or more partitions while being a secondary server for partitions. Further, a server may be the primary server for a partition at one time and the secondary server for the same partition at another time.

FIG. 3 depicts a block diagram of an example data structure for a memory table 140-1 at a primary server A, according to an embodiment of the invention. The memory table 140-1 comprises any number of entries, one for each memory block address in the memory 102 at the primary server A that was accessed by execution of a partition 134 at the primary server A. Each of the entries comprises a memory block address field 302. Each of the entries also comprises an error at primary server A field 304, an error at secondary server B field 306, an error at secondary server C field 308, and an error at secondary server D field 310, but in other embodiments more or fewer fields may be present, corresponding to the number of primary and secondary servers connected to the network 130.

The memory block address field 302, in each entry specifies an address of a memory location or memory block within the memory 102 of a server. The same memory block address 302 at various servers are said to correspond, meaning they have the identical memory block address, but in different memory in different servers. In various embodiments, the address specified by the memory block address field 302 may be a logical address, a physical address, a virtual address, an absolute address, or a relative address. The error at primary server A field 304, the error at secondary server B field 306, the error at secondary server C field 308, and the error at secondary server D field 310 specify the respective error status of the respective memory locations specified by the same memory block address 302, in each entry, at the respective servers. In various embodiments, the error status may indicate that the memory location at the memory block address 302 at the respective server has no error, that the memory location at the memory block address 302 at the respective server had an error that was corrected, or that the memory location at the memory block address has an uncorrectable error, i.e., an error that cannot be corrected.

In various embodiments, a corrected error is a transient, soft, or intermittent error that the server corrected via retrying the operation that encountered the error (and the retry does not encounter the problem) or by use of ECC (Error Correction Code), which determines single-bit or double-bit errors in memory and rewrites the corrected data to the memory location that encountered the error, and the rewriting encountered no further error, so that the server may continue to access the memory block address that encountered the corrected error after correcting the error. In various embodiments, the corrected error may have been caused by electronic magnet noise, cosmic rays, or by the degradation of memory cells that will eventually lead to uncorrectable errors in memory as the degradation continues over time. In various embodiments, an uncorrectable error is a hard error, a non-transient error, an error caused by a defect in the memory circuit that the server cannot correct, fix, or recover, so that the server stops accessing that memory location after detecting the uncorrectable error or after trying and failing to correct the error.

The memory table 140-1 further comprises a number of memory blocks at secondary server B with errors field 312, a number of memory blocks at secondary server C with errors field 314, and a number of memory blocks at secondary server D with errors field 316. The number of memory blocks at secondary server B with errors field 312, the number of memory blocks at secondary server C with errors field 314, and the number of memory blocks at secondary server D with errors field 316 count the number of memory blocks at the respective servers that have corrected and/or uncorrectable errors.

Figure 4:
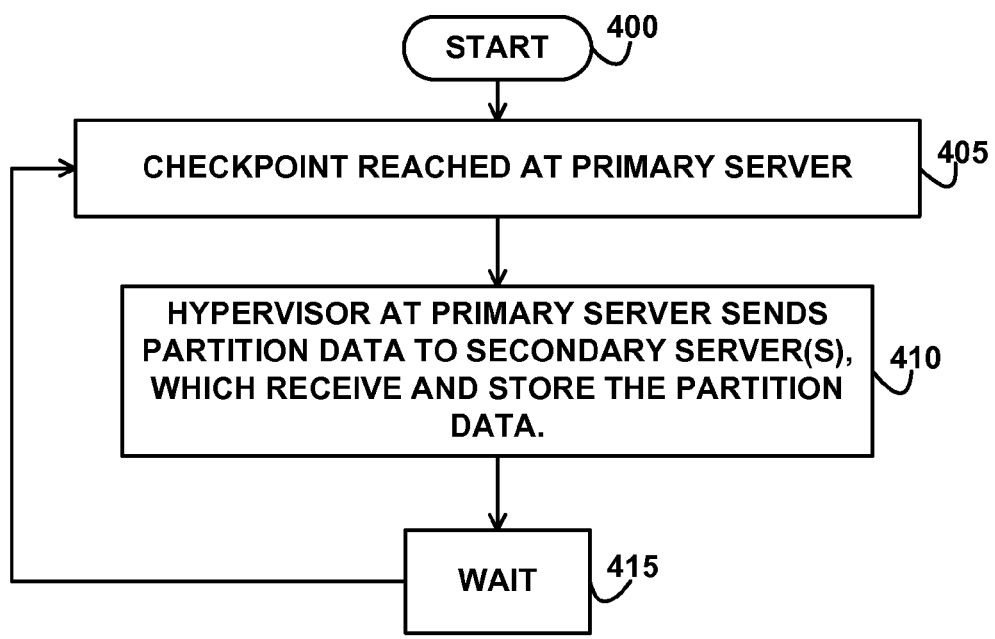
FIG. 4 depicts a flow chart of example processing for checkpoints, according to an embodiment of the invention.

FIG. 4 depicts a flow chart of example processing for checkpoints, according to an embodiment of the invention. The logic of FIG. 4 may be performed any number of times and at any primary server, such as the servers 100-1, 100-2, 100-3, and 100-4. The logic of FIG. 4 may be executed simultaneously, concurrently, or interleaved on the same or different processors of the same or different servers with the logic of FIGS. 5, 6, and 7. Control begins at block 400. Control then continues to block 405 where a checkpoint is reached for a partition 134 that executes at a primary server. A checkpoint is represented by the expiration of a period of time or by another checkpoint boundary determining event. In an embodiment, the hypervisor 136 may determine that a checkpoint has been reached by detecting the firing of a timer. Control then continues to block 410 where, in response to the checkpoint being reached, the hypervisor 136 at the primary server sends partition data 148 to secondary server(s), which receive and store the partition data 148 in their respective memory. In this way, the primary server periodically sends partition data 148 to secondary servers. Control then continues to block 415 where the hypervisor 136 at the primary server waits (for a period of time until the next checkpoint is reached). Control then returns to block 405, as previously described above.

Figure 5:
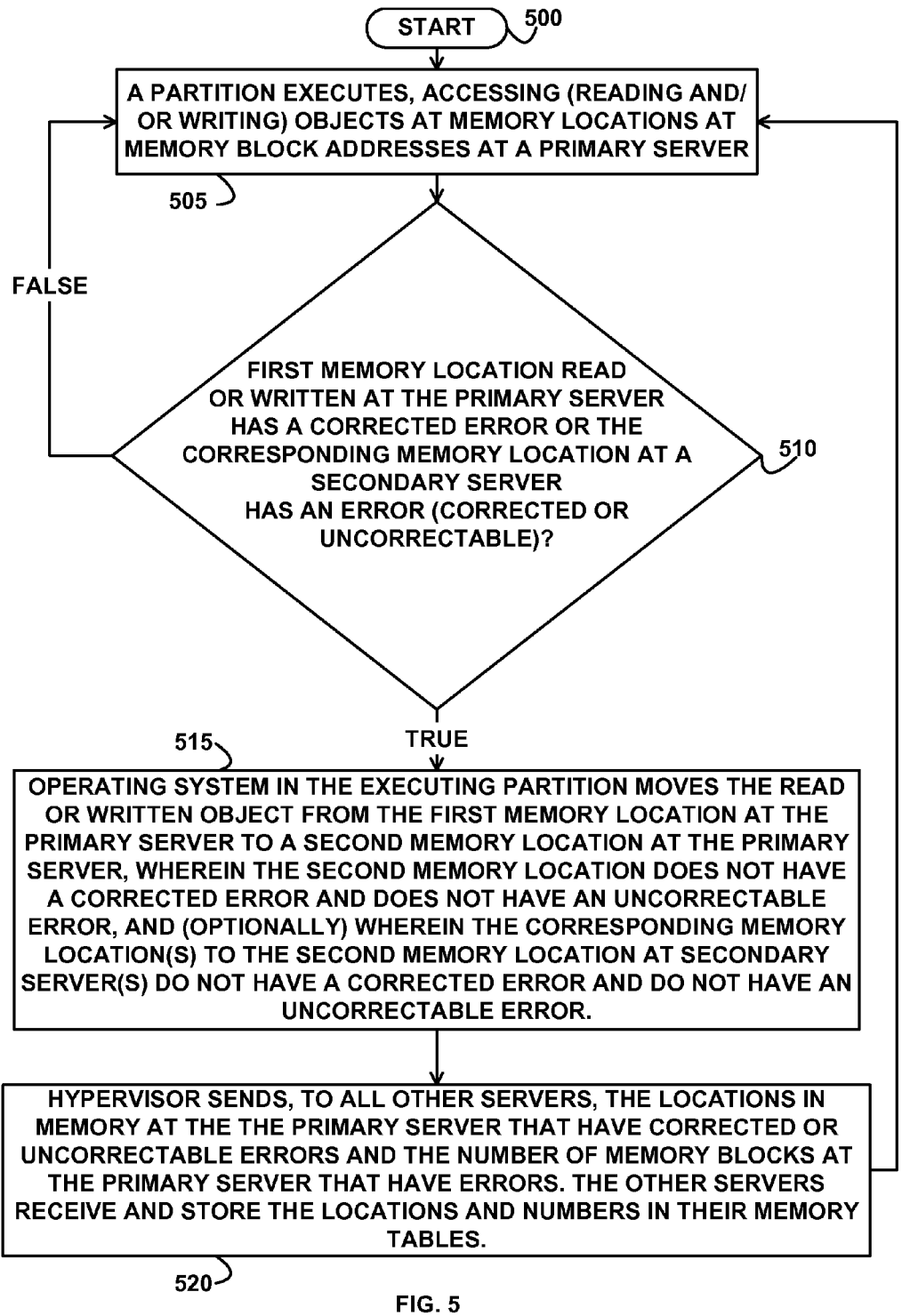
FIG. 5 depicts a flow chart of example processing for handling memory errors, according to an embodiment of the invention.

FIG. 5 depicts a flow chart of example processing for handling memory errors, according to an embodiment of the invention. The logic of FIG. 5 may be performed any number of times and at any primary server, such as the servers 100-1, 100-2, 100-3, and 100-4. Control begins at block 500. Control then continues to block 505 where a partition 134 executes at a primary server, accessing (reading and/or writing) objects at memory locations at memory block addresses in the memory 102 at the primary server.

Control then continues to block 510 where the operating system 146 at the primary server determines whether a first memory location accessed by the executing partition 134 (read or written) at the primary server had a corrected error or the corresponding memory location at a secondary server (corresponding to the first memory location at the primary server) has or had an error (corrected or uncorrectable). If the determination at block 510 is true, then a first memory location accessed by the executing partition 134 (read or written) at the primary server had a corrected error or the corresponding memory location at a secondary server (corresponding to the first memory location at the primary server) had a corrected error or has an uncorrectable error, so control continues to block 515 where the operating system 146 in the executing partition 134 moves the read or written object from the first memory location at the primary server to a second memory location at the primary server. The second memory location does not have an uncorrectable error or did not have a corrected error, and (optionally) wherein the corresponding memory location(s) to the second memory location (the corresponding memory location is at the secondary server) does not have an uncorrectable error or did not have a corrected error. The partition is not executing at the secondary server at the time of the determination that the first memory location had an error, at the time of the determination that the corresponding memory location at the secondary server had an error, and at the time of the moving of the object from the first memory location to the second memory location at the primary server. The operating system 146 refrains from moving the object to a second memory location at the primary server that has a corresponding memory location at a secondary server with an error (corrected or uncorrectable), even if the second memory location at the primary server does not have an error.

Control then continues to block 520 where the hypervisor 136 at the primary server sends, to all other servers connected to the primary server, the locations in memory at the primary server that have corrected or uncorrectable errors and the number of memory blocks at the primary server that have corrected or uncorrectable errors. The other servers receive and store the locations and numbers in their respective memory tables. Control then returns to block 505 where the partition 134 continues executing on the primary server, accessing the same or different objects at the same or different memory locations, as previously described above.

If the determination at block 510 is false, then no memory locations accessed by the executing partition 134 at the primary server had a corrected error and the corresponding memory locations at a secondary server to the memory locations accessed by the executing partition 134 at the primary server did not have a corrected error and did not have an uncorrectable error, so control returns to block 505 where the partition 134 continues executing on the primary server, accessing the same or different objects at the same or different memory locations, as previously described above, without performing the processing described in blocks 515 and 520.

Figure 6:
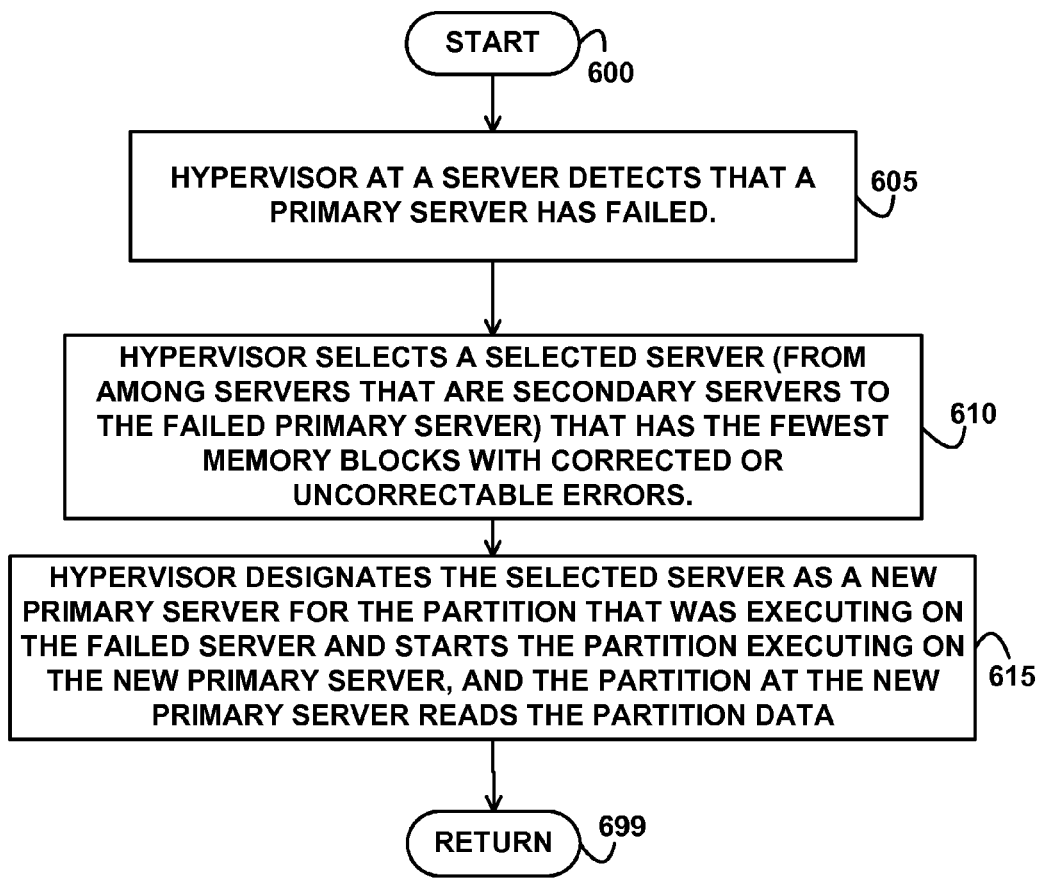
FIG. 6 depicts a flow chart of example processing for handling the failure of a primary server, according to an embodiment of the invention.

FIG. 6 depicts a flow chart of example processing for handling the failure of a primary server, according to an embodiment of the invention. The logic illustrated in FIG. 6 may be executed any number of times and may be executed at any server computer, such as the server computers 100-1, 100-2, 100-3, and 100-4. Control begins at block 600. Control then continues to block 605 where a hypervisor 136 at a server computer 100 detects that a primary server has failed. In various embodiments, the hypervisor 136 determines that the primary server has failed in response to not receiving a message, packet, signal or other notification from the primary server within a period of time. In various embodiments, the hypervisor 136 receives a specification of the period of time from the user I/O device 121, from the network 130, or from a designer of the hypervisor 136. In an embodiment, the hypervisor 136 determines that the primary server has failed via a heartbeat protocol. In various embodiments, the primary server may have failed because of an infinite loop at the primary server, a loss of electrical power (intentional or unintentional) to the primary server, or a program or hardware error at the primary server.

Control then continues to block 610 where the hypervisor 136 at the server computer 100 selects a selected secondary server (from among all the servers that are secondary servers to the failed primary server) that has the fewest, least, or smallest number of memory blocks with error that were corrected or that are uncorrectable, as compared to all other secondary servers.

Control then continues to block 615 where the hypervisor 136 at the server computer 100 designates the selected secondary server as a new primary server for the partition 134 that was executing on the failed server computer (prior to failure of the failed server computer) and starts the partition 134 executing on the new primary server (the selected secondary server), and the partition 134 at the new primary server reads the partition data 148 from the new primary server and uses the partition data 148 to determine the state of the processor on which the partition 134 executes and/or the state of the transaction or request that the partition 134 is processing. The partition 134 executes on the new primary server per the logic of FIGS. 4 and 5, using the memory table 140 at the new primary server. Control then continues to block 699 where the logic of FIG. 6 returns.

Figure 7:
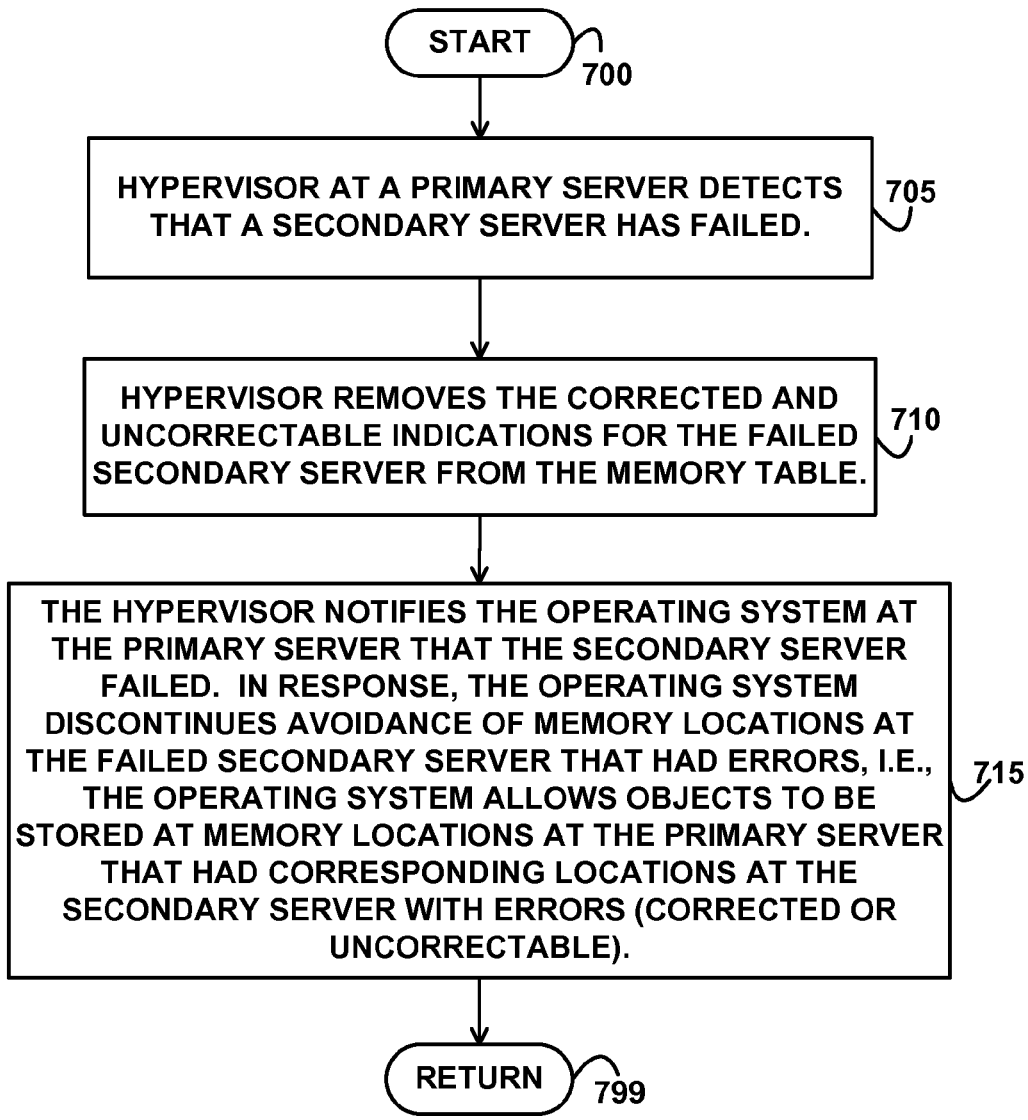
FIG. 7 depicts a flow chart of example processing for handling the failure of a secondary server, according to an embodiment of the invention.

FIG. 7 depicts a flow chart of example processing for handling the failure of a secondary server, according to an embodiment of the invention. The logic illustrated in FIG. 7 may be executed any number of times and may be executed at any primary server computer, such as the server computers 100-1, 100-2, 100-3, and 100-4. Control begins at block 700. Control then continues to block 705 where the hypervisor 136 at a primary server detects that a secondary server has failed. In various embodiments, the hypervisor 136 determines that the secondary server has failed in response to not receiving a message, packet, signal or other notification from the secondary server within a period of time. In an embodiment, the hypervisor 136 determines that the secondary server has failed via a heartbeat protocol. In various embodiments, the secondary server may have failed because of an infinite loop at the secondary server, a loss of electrical power (intentional or unintentional) to the secondary server, or a program or hardware error at the secondary server. Control then continues to block 710 where, in response to detecting that the secondary server has failed, the hypervisor 136 removes the corrected and uncorrectable error indications for the failed secondary server from the memory table 140 at the primary server.

Control then continues to block 715 where, in response to detecting that the secondary server has failed, the hypervisor 136 notifies the operating system 146 at the primary server that the secondary server failed. In response to receiving the notification, the operating system 146 at the primary server discontinues avoidance of memory locations at the failed secondary server that had errors, i.e., the operating system 146 at the primary server allows objects to be stored at memory locations at the primary server that had corresponding locations at the secondary server with errors (corrected or uncorrectable). Control then continues to block 799 where the logic of FIG. 7 returns.

In this way, in an embodiment, a partition may avoid encountering memory errors immediately after a failover operation.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. In the previous description, numerous specific details were set forth to provide a thorough understanding of embodiments of the invention. But, embodiments of the invention may be practiced without these specific details. In other instances, well-known circuits, structures, and techniques have not been shown in detail in order not to obscure embodiments of the invention.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure is not necessary. The previous detailed description is, therefore, not to be taken in a limiting sense.

What is claimed is:

1. A method comprising:
    executing a first partition at a primary server, wherein the first partition accesses a first memory location at a first memory block address at the primary server;
    maintaining a non-executing second partition at a secondary server, the second partition being a mirrored version of the first partition containing non-executing applications and an operating system installed in the first partition, wherein data form the first partition is periodically copied to the second partition, the second partition being available to begin executing in the event of failure of the first partition; and
    if a first corresponding memory location at the secondary server has an error, wherein the first corresponding memory location at the secondary server corresponds to the first memory location at the primary server, moving an object from the first memory location at the primary server to a second memory location at the primary server.

2. The method of claim 1, wherein the moving the object further comprises:
    moving the object from the first memory location at the primary server to the second memory location at the primary server that corresponds to a second corresponding memory location at the secondary server, wherein the second corresponding memory location at the secondary server does not have the error.

3. The method of claim 1, wherein the first corresponding memory location at the secondary server corresponds to the first memory location at the primary server when the first memory block address of the first memory location at the primary server is identical to a first corresponding memory block address of the first corresponding memory location at the secondary server.

4. The method of claim 1, further comprising:
    starting the second partition executing on the secondary server in response to detecting that the primary server has failed, wherein the detecting that the primary server has failed further comprises detecting that the secondary server has not received a message from the primary server within a time period.

5. The method of claim 4, further comprising:
    selecting the secondary server from among a plurality of secondary servers that has a smallest number of memory blocks with errors.

6. The method of claim 1, further comprising:
    in response to detecting that the secondary server has failed, allowing objects to be stored at the first memory location at the primary server.

7. The method of claim 1, wherein the error comprises a corrected error.

8. The method of claim 1, wherein the error comprises an uncorrectable error.

9. A non-transitory computer-readable storage medium encoded with instructions, wherein the instructions when executed comprise:
    executing a partition at a primary server, wherein the partition accesses a first memory location at a first memory block address at the primary server;
    if a first corresponding memory location at a secondary server has an error, wherein the first corresponding memory location at the secondary server corresponds to the first memory location at the primary server, moving an object from the first memory location at the primary server to a second memory location at the primary server, wherein the moving the object further comprises moving the object from the first memory location at the primary server to the second memory location at the primary server that corresponds to a second corresponding memory location at the secondary server, wherein the second corresponding memory location at the secondary server does not have the error; and
    in response to detecting that the secondary server has failed, allowing objects to be stored at the first memory location at the primary server.

10. The non-transitory computer-readable storage medium of claim 9, wherein the first corresponding memory location at the secondary server corresponds to the first memory location at the primary server when the first memory block address of the first memory location at the primary server is identical to a first corresponding memory block address of the first corresponding memory location at the secondary server.

11. The non-transitory computer-readable storage medium of claim 9, further comprising:
    starting the partition executing on the secondary server in response to detecting that the primary server has failed, wherein the detecting that the primary server has failed further comprises detecting that the secondary server has not received a message from the primary server within a time period.

12. The non-transitory computer-readable storage medium of claim 11, further comprising:
    selecting the secondary server from among a plurality of secondary servers that has a smallest number of memory blocks with errors.

13. The non-transitory computer-readable storage medium of claim 9, wherein the detecting that the secondary server has failed further comprises detecting that the primary server has not received a message from the secondary server within a time period.

14. The non-transitory computer-readable storage medium of claim 9, wherein the error comprises a corrected error.

15. The non-transitory computer-readable storage medium of claim 9, wherein the error comprises an uncorrectable error.

16. A computer comprising:
   a processor; and
   memory communicatively coupled to the processor, wherein the memory is encoded with instructions, and wherein the instructions when executed on the processor comprise:
      executing a partition at a primary server, wherein the partition accesses a first memory location at a first memory block address at the primary server,
      if a first corresponding memory location at a secondary server has an error, wherein the first corresponding memory location at the secondary server corresponds to the first memory location at the primary server, moving an object from the first memory location at the primary server to a second memory location at the primary server, and
      in response to detecting that the secondary server has failed, allowing objects to be stored at the first memory location at the primary server.

17. The computer of claim 16, wherein the instructions further comprise:
   selecting the secondary server from among a plurality of secondary servers that has a smallest number of memory blocks with errors.

18. The computer of claim 16, wherein the error comprises a corrected error.

19. The computer of claim 16, wherein the error comprises an uncorrectable error.

20. The computer of claim 16,
   wherein the moving the object further comprises moving the object from the first memory location at the primary server to the second memory location at the primary server that corresponds to a second corresponding memory location at the secondary server, wherein the second corresponding memory location at the secondary server does not have the error, wherein the first corresponding memory location at the secondary server corresponds to the first memory location at the primary server when the first memory block address of the first memory location at the primary server is identical to a first corresponding memory block address of the first corresponding memory location at the secondary server, wherein the partition is not executing at the secondary server at a time of a determination that the first corresponding memory location at the secondary server has the error, and
   wherein the instructions when executed on the processor further comprise: starting the partition on the secondary server in response to detecting that the primary server has failed, wherein the detecting that the primary server has failed further comprises detecting that the secondary server has not received a message from the primary server within a time period.

* * * * *